No. 748,918. PATENTED JAN. 5, 1904.
W. H. BRISTOL.
RECORD SHEET FOR RECORDING INSTRUMENTS.
APPLICATION FILED SEPT. 21, 1903.

NO MODEL.

WITNESSES:
Geo. W. Ewenbrawn
R. B. Bloemeke

INVENTOR:
William H. Bristol,
BY
A. Faber du Faur Jr.
ATTORNEY.

No. 748,918. Patented January 5, 1904.

UNITED STATES PATENT OFFICE.

WILLIAM H. BRISTOL, OF HOBOKEN, NEW JERSEY.

RECORD-SHEET FOR RECORDING INSTRUMENTS.

SPECIFICATION forming part of Letters Patent No. 748,918, dated January 5, 1904.

Application filed September 21, 1903. Serial No. 174,104. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Record-Sheets for Recording Instruments, of which the following is a specification.

My invention has reference to improvements in record-sheets adapted for all types of recording instruments, but particularly for delicate instruments in which the friction between the usual pencil or pen is objectionable and to such instruments where the pen is subject to rapid and frequent pulsations or a long run is necessary or desirable.

Heretofore the record has generally been made by the use of a pencil or ink stylus bearing upon a moving sheet having thereon a suitable scale. In delicate instruments the use of the pencil is objectionable, as the friction is comparatively great, while the ink-stylus in case of rapid pulsations is very liable to produce blots or blurs, and in case of long runs the ink dries out, and consequently an unsatisfactory and partially-illegible record results. With instruments used on board ship the vibrations of the vessel also produce irregularities in the record, and the ink is liable to be thrown out of the stylus.

Record-sheets have also been prepared with an opaque surface of removable material and used in connection with a sharp-pointed stylus, the graduations being exposed to view by interruptions in the removable surface.

My invention has therefore for its object to provide a record-sheet adapted for use in conjunction with a sharp-pointed stylus and having its record-surface of such nature as to reduce the friction to a minimum, thus rendering it particularly applicable to delicate instruments, and my invention has also for its object to produce a record free and clear of blurs or other defects, thus rendering the chart also adapted for use in extremely-sensitive instruments and in instruments where frequent pulsations of the stylus take place.

To this end my invention consists, essentially, in a record-sheet for recording instruments comprising a base, a scale of different color thereon, and a removable record-surface over said scale and through which the latter is visible.

The nature of my invention will best be understood when described in connection with the accompanying drawings, in which—

Figure 1:
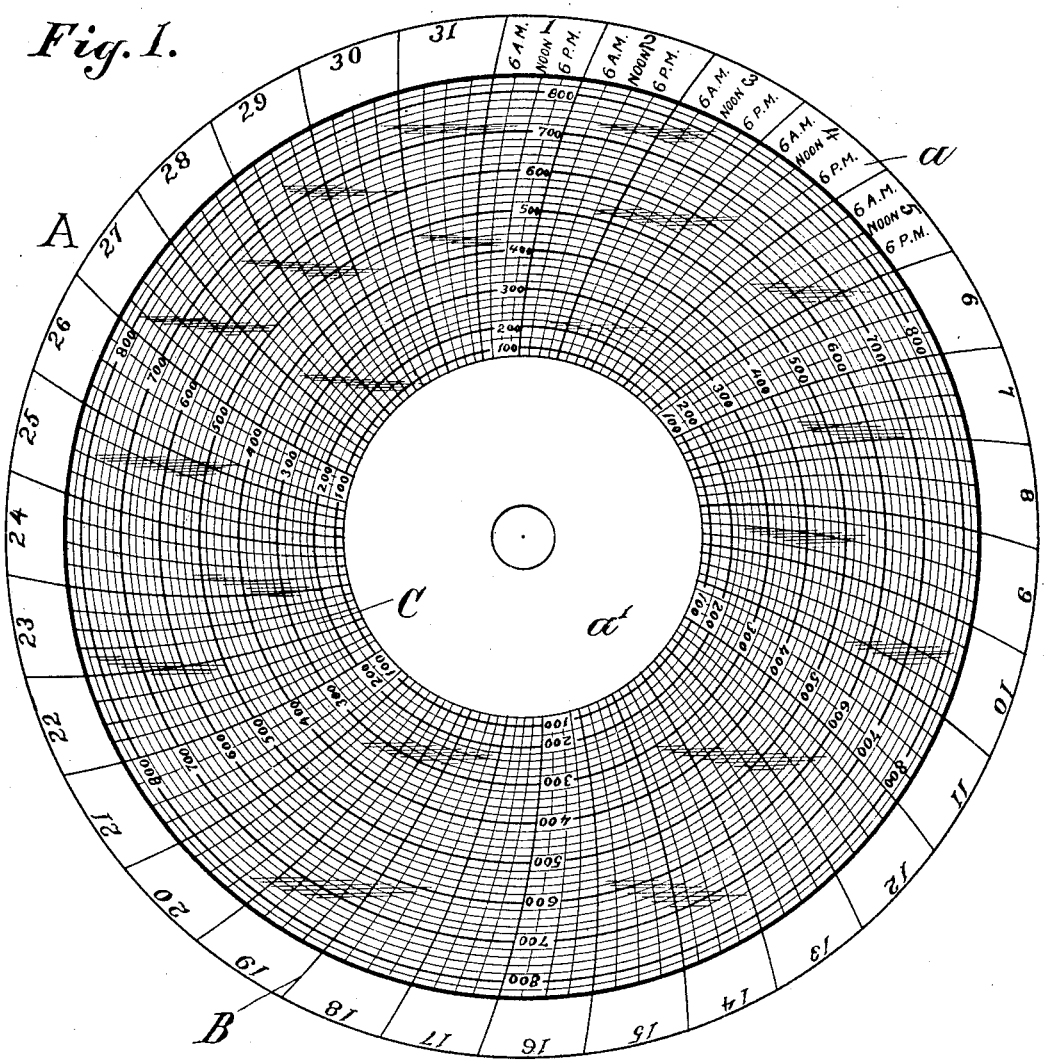
Figure 2:

Figure 1 represents a face view of the record-sheet embodying my invention. Fig. 2 is a transverse section thereof.

Similar letters of reference designate corresponding parts throughout the several views of the drawings.

Referring now to the drawings, the letter A designates the base of a circular sheet or chart to be made of paper, metal, mica, celluloid, or other suitable material and having printed or otherwise inscribed thereon a scale B differing in color from that of the base. In the present instance the sheet is intended for use in an electric recording instrument with a rotary dial-plate, and the scale is correspondingly constructed. It is, however, to be understood that I do not wish to restrict myself to the circular form of the base or to the particular graduations or nature of the scale or the accessories, as the base may be in the form of a strip or of other configuration.

The base A is preferably made of white paper with a scale of black printer's ink thereon, and its face is coated with a thin covering C of material readily removable by a sharp-pointed stylus pressing very lightly upon the base. This removable surface may consist of soot or lampblack or any other material which, although being of a dark color or opaque, becomes semitransparent when applied quite thin. The surface may be applied by dusting or floating the material over the base and rubbing in or by applying the same with a brush or other means; but in practice I prefer to form the surface by smoking the base in a manner similar to that in which glass is smoked—that is, by holding the same over a smoking oil-burner. The removable surface so formed is penetrated by the stylus and practically offers no resistance to its removal, and consequently little or no friction is caused, while a sharp and distinct record is left behind, which can be easily read as the scale is visible through the said surface. In case of frequent pulsations, particularly when the graduations of the scales are close together, the record is still clear, as the closely-adjacent portions of the lines do not run together, as they would with the ordinary chart and ink stylus. After the record is complete the sheet may be removed and filed away for reference, as usual, although it is preferable to first fix the removable surface. This may be accomplished by spraying thereon a usual fixative such as is employed by artists in fixing crayon or carbon drawings. The ordinary commercial fixative answers this purpose very well. This step permits the chart to be handled without defacing the record. As shown in the drawings, only the record portion of the sheet is covered with the removable surface, thus leaving a margin $a$, permitting the chart to be handled without marring or defacing said surface and facilitating the packing of the sheets for shipment. In the case of the circular chart an exposed central portion $a'$ is formed, which also affords means for separating the charts in packing.

The removable surface, while quite thinly applied, may be of greater or less depth, according to its nature, but should not be of such depth as to offer material resistance to the movements of the stylus, nor should it be of such inherent consistency as to offer material resistance to the stylus, and so impede the movements thereof. In case of soot or lampblack a quite heavy application may be made, sufficient even to render the scale indistinct or entirely invisible, without offering material resistance to the stylus, and the scale and accessories can be rendered visible by the use of the fixative hereinbefore described.

What I claim as new is—

1. A record-sheet for recording instruments comprising a base, a scale of different color thereon, and a removable record-surface over said scale, through which the latter is visible, substantially as described.

2. A record-sheet for recording instruments comprising a base, a scale of different color thereon, and a removable record-surface over said scale through which the latter is visible, and part of the face of the base being left exposed, substantially as described.

3. A recording instrument record-sheet comprising a base, a scale of different color thereon, a removable record-surface over said scale, through which the latter is visible, and a fixative for the record-surface, substantially as described.

4. A record-sheet for recording instruments comprising a base, a scale of different color thereon, and a removable record-surface of soot or lampblack over said scale through which the latter is visible, substantially as described.

5. A recording instrument record-sheet comprising a base, a scale of different color thereon, a removable record-surface of soot or lampblack over said scale through which the latter is visible, and a fixative for the record-surface, substantially as described.

6. A record-sheet comprising a light-colored paper base, a scale of dark printer's ink thereon, and a removable, semitransparent record-surface of soot or lampblack over the scale, through which the latter is visible, substantially as described.

7. A recording instrument record-sheet comprising a base, a scale of different color thereon, a removable record-surface over said scale, and a fixative for the record-surface which renders the scale visible on application, substantially as described.

In testimony whereof I have hereunto set my hand in the presence of two subscribing witnesses.

WILLIAM H. BRISTOL.

Witnesses:
A. FABER DU FAUR, Jr.,
RAENA H. YUDIZKY.